F. CRAWFORD.
SELF OILING HUB.
APPLICATION FILED SEPT. 13, 1918.
1,312,683.
Patented Aug. 12, 1919.
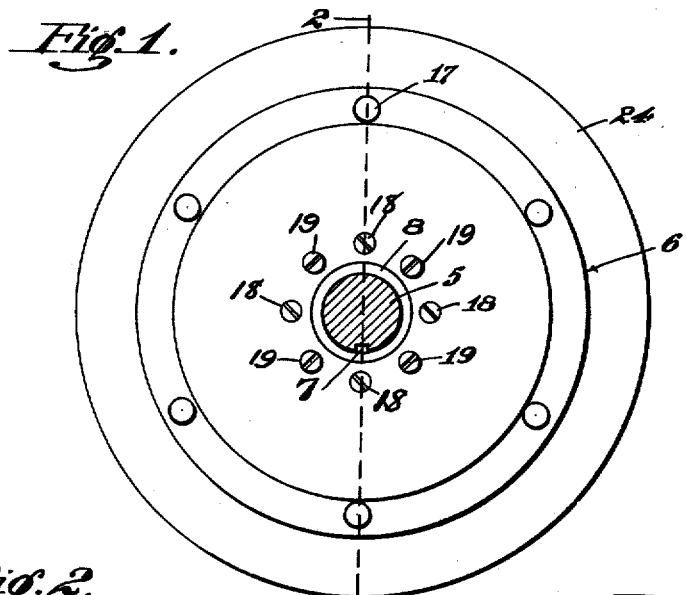
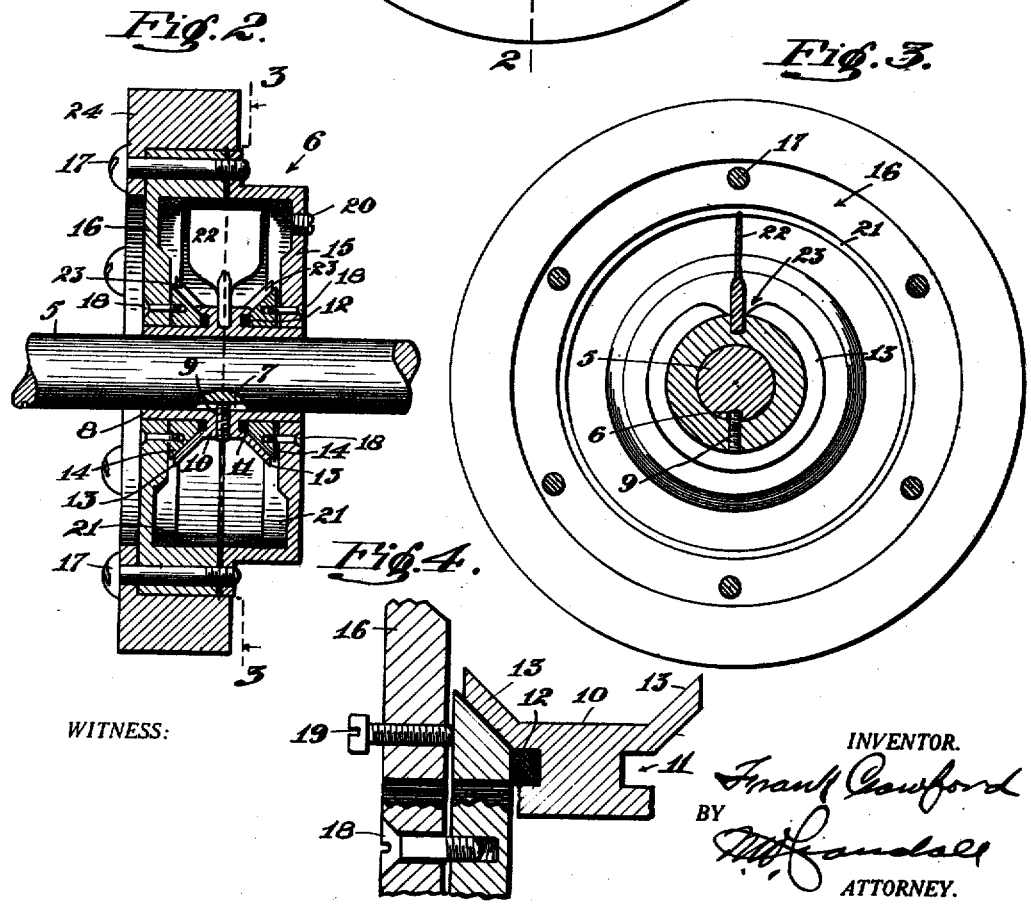
WITNESS:
INVENTOR.
Frank Crawford
BY
ATTORNEY.
THE COLUMBIA PLANOGRAPH CO., WASHINGTON, D. C.

UNITED STATES PATENT OFFICE.

FRANK CRAWFORD, OF LOS ANGELES, CALIFORNIA.

SELF-OILING HUB.

1,312,683. Specification of Letters Patent. Patented Aug. 12, 1919.

Application filed September 13, 1918. Serial No. 254,026.

*To all whom it may concern:*

Be it known that I, FRANK CRAWFORD, a citizen of the United States, residing at Los Angeles, in the county of Los Angeles and State of California, have invented new and useful Improvements in Self-Oiling Hubs, of which the following is a specification.

This invention relates to a self oiling pulley hub and the primary object thereof is to provide a hub for idler pulleys, wheels and the like adapted to receive a fluid lubricant and so constructed that as it revolves the lubricant will be fed to the hub bearing surface.

Another object is to provide a means in hubs of the above character whereby the wear of the hub bearing may be taken up from time to time and the wearing surfaces readily renewed as occasion may require.

A further object is to provide a hub bearing embodying a pair of opposed truncated cone bearing members mounted for adjustment and adapted to be automatically lubricated by a fluid lubricant carried by the hub.

Other objects will appear hereinafter.

The invention is illustrated in the accompanying drawings, in which;

Figure 1 is a view of the hub in elevation;

Fig. 2 is a view in vertical section and elevation as seen on the line 2—2 of Fig. 1;

Fig. 3 is a vertical longitudinal section and elevation as seen on the line 3—3 of Fig. 2;

Fig. 4 is a detail illustrating the manner of adjusting the truncated cone bearings whereby wear may be taken up.

More specifically 5 indicates a shaft or similar member on which the pulley hub 6 is to be revolubly mounted, this shaft being formed with a key-way 7 and fitted with a collar 8 of peculiar design which is secured on the shaft against movement thereon by a set-screw 9 extending into the key-way. The collar 8 has a cylindrical outer wall and is formed with an annular peripheral flange 10 intermediate its ends formed with channels 11 on its opposite sides to receive absorptive rings 12 and having outwardly divergent walls 13 on its opposite edges forming a trough on the outer face of the flange and also forming outwardly tapered faces on their undersides constituting female bearing members adapted to slidably receive truncated cone male bearing members 14 carried by the hub 6.

The hub is formed of a pair of disks 15 and 16 having inturned annular flanges adapted to be detachably connected together by bolts 17 to position the disks on opposite sides of the female bearing members, the disks being formed with central openings to admit their being slipped over the collar. The truncated cone bearings are adjustably mounted on the inner faces of the disks by means of screws 18 slidable in the disks and screwed into the bearings, set-screws 19 are screw-threaded into the disks 15 and 16 and take seat against the bearing members 14 and coöperate with the screws 18 to hold the bearings in the desired position. To adjust the bearings either the screws or set-screws are loosened, or both, and the bearings advanced by the set-screws or retracted by the screws. By this construction a very fine adjustment can be obtained so that the cone bearings can be seated with the proper contact on their companion bearings, wear being taken up by adjusting the cone bearings from the exterior of the hub as occasion may require.

The space within the hub is designed to receive a liquid lubricant which is delivered thereto through an inlet, normally closed by a plug 20, only such quantity of lubricant being placed in the hub as will form a shallow body over the inner periphery of the hub when the latter is rapidly revolved and the lubricant distributed under the action of centrifugal force. A pair of bands of felt or similar absorptive material 21 are placed in the hub at the intersection of the inner faces of the disks and their inturned flanges, which bands are spaced apart to form a channel therebetween, the bands serving the purpose of collecting foreign substances which might be in the lubricant.

As a means for delivering the lubricant to the cone bearings a blade 22 is mounted on the flange 10 and projects transversely of the hub adjacent to its inner periphery at the upper portion thereof.

The flanges 13 have openings 23 therethrough arranged at the base of the blade in such manner that lubricant collected by the blade and draining therefrom may be delivered to the faces of the cone bearings through said openings, excess lubricant draining from the flanges into the lower portion of the hub to be redistributed.

Any sort of rim 24 may be mounted on the hub, according to the character of the pulley or wheel with which the hub is to be employed, the rim being here shown as attached to the hub by the bolts 17.

In the operation of the invention, a fluid lubricant within the hub will be distributed over the inner periphery of the latter on rotation thereof, by the action of centrifugal force. Portions of the lubricant will be gathered by the upwardly projecting blade and directed downwardly thereby toward the bearing centrally of the hub and portions of the lubricant thus collected will be fed to the wearing surfaces of the cones exposed through the openings 23 in the female bearing members.

When it is desired to take up wear of the bearings, the truncated cones are slightly advanced into proper contact with their companion bearing members as before described.

While a specific embodiment of the invention has been shown and described, it is manifest that various changes may be made in the details of the several parts without departing from the spirit of the invention as set forth in the appended claims.

I claim;

1. In a self oiling hub, a shaft, a hollow hub thereon, a pair of opposed female bearing members fixed on said shaft within the hub, and a pair of opposed truncated cone bearings on said hub extending into said female bearing members.

2. In a self oiling hub, a shaft, a hollow hub thereon, a pair of opposed female bearing members fixed on said shaft within the hub, a pair of truncated cone bearings on said hub extending into said female bearing members, and means for adjusting said cone bearings relative to said female bearing members whereby proper contact may be attained.

3. In a self oiling hub, a shaft, a hollow hub thereon, a pair of opposed female bearing members fixed on said shaft within the hub, a pair of opposed truncated cone bearings on said hub extending into said female bearing members, and means for delivering a fluid lubricant contained in the hub from the inner periphery thereof to the bearing members.

4. In a self oiling hub, a shaft, a hollow hub thereon, a pair of female bearing members fixed on said shaft, said members comprising opposed outwardly tapered flanges, a pair of opposed truncated cone bearing members extending into said female bearing members, and means for delivering fluid lubricant contained in the hub from the inner periphery thereof to the wearing faces of the bearing members through said tapered flanges.

5. In a self oiling hub, a shaft, a hollow hub thereon, a pair of opposed female bearing members fixed on the shaft, a pair of opposed truncated cone bearing members carried by the hub and extending into said female bearing members, said hub adapted to receive a fluid lubricant which will be distributed over the inner periphery of the hub on rotation thereof by centrifugal force, a blade fixed relative to the female bearing members adapted to intercept portions of the lubricant carried by the inner periphery of the hub, and openings in said female bearing members whereby portions of the lubricant thus gathered will be delivered to the wearing faces of the bearings.

6. In a self oiling hub, a shaft, a collar fixed thereon having a central annular flange, outwardly divergent bearing walls projecting from the opposite sides of said flange having openings in their upper portions, a pair of disks encircling said collar on opposite sides of the flange having inturned outer edges connected together forming a lubricant receiving chamber, a pair of absorptive rings on the inner faces of said disks spaced apart to form an annular channel on the inner periphery of the inturned edges, a pair of opposed truncated cone bearings adjustably extending into the divergent bearing walls into slidable engagement therewith, portions of the surface of each of said cone bearings being exposed through the openings in said walls, and a blade extending upwardly from the annular flange between said openings and having its upper edge extending into the channel to intercept a portion of such lubricant as may be caused to cover the bottom of the channel and direct a part thereof to the bearings through said openings.

FRANK CRAWFORD.

Copies of this patent may be obtained for five cents each, by addressing the "Commissioner of Patents, Washington, D. C."